US011168007B2

(12) United States Patent
Lewis, III

(10) Patent No.: US 11,168,007 B2
(45) Date of Patent: Nov. 9, 2021

(54) NON-THERMAL PLASMA TREATMENT APPARATUS, METHOD AND SYSTEM

(71) Applicant: Greenpath Industries, LLC, Brooksville, FL (US)

(72) Inventor: Joseph E Lewis, III, Holly Hill, FL (US)

(73) Assignee: GreenPath Industries, LLC, Brooksville, FL (US)

( * ) Notice: Subject to any disclaimer, the term of this patent is extended or adjusted under 35 U.S.C. 154(b) by 127 days.

(21) Appl. No.: 16/301,706

(22) PCT Filed: Apr. 13, 2018

(86) PCT No.: PCT/US2018/027416
§ 371 (c)(1),
(2) Date: Nov. 14, 2018

(87) PCT Pub. No.: WO2018/226313
PCT Pub. Date: Dec. 13, 2018

(65) Prior Publication Data
US 2020/0071199 A1 Mar. 5, 2020

Related U.S. Application Data

(60) Provisional application No. 62/517,795, filed on Jun. 9, 2017.

(51) Int. Cl.
*C02F 1/48* (2006.01)
*C02F 1/46* (2006.01)
*B01J 19/08* (2006.01)
*H05H 1/48* (2006.01)
*C02F 1/461* (2006.01)

(52) U.S. Cl.
CPC .......... *C02F 1/4608* (2013.01); *B01J 19/088* (2013.01); *H05H 1/48* (2013.01); *C02F 2001/46152* (2013.01)

(58) Field of Classification Search
CPC .............. C02F 1/46; H05H 1/48; B01J 19/08
See application file for complete search history.

(56) References Cited

U.S. PATENT DOCUMENTS

| 9,230,777 B2 | 1/2016 | Foret |
| 9,346,691 B2 | 5/2016 | Johnson |
| 9,352,984 B2 | 5/2016 | Campbell et al. |
| 2014/0322096 A1* | 10/2014 | Pelfrey ............... A61L 2/14 422/291 |

\* cited by examiner

*Primary Examiner* — Walter D. Griffin
*Assistant Examiner* — Cameron J Allen
(74) *Attorney, Agent, or Firm* — Edward M. Livingston, Esq.; Livingston Law, P.A.

(57) ABSTRACT

The invention comprises an apparatus, method and system used to treat various liquids, seeds, and soil or other growth media used in cultivating plants by exposure to a plasma discharge. The system comprises a novel electrode structure which utilizes a tapered inner electrode and a porous outer electrode to create a three-dimensional plasma discharge, which is applied to liquid, seeds or growth media through removably attachable sub-assemblies. When used to treat water or seeds, highly-concentrated plasma activated water (PAW) and disease and drought resistant plasma activated seeds (PAS), respectively, are produced, which improve germination rate and efficiency, and eliminate the need for ammonia-based chemical fertilizers.

13 Claims, 12 Drawing Sheets

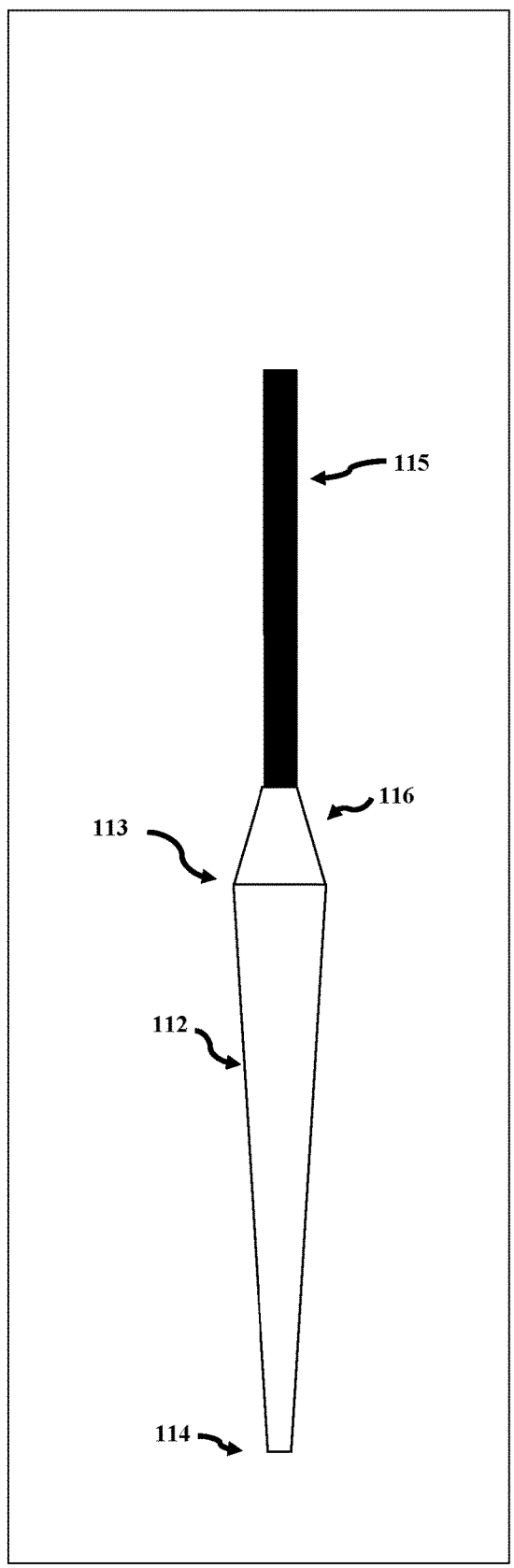
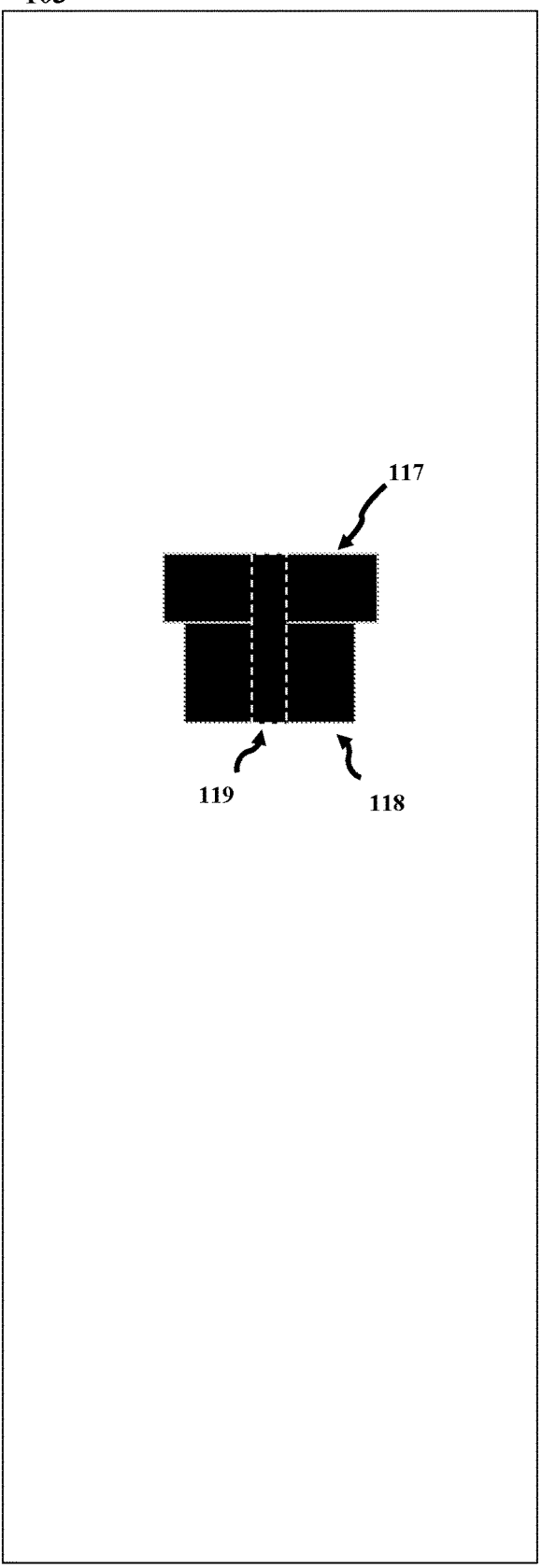

600

NON-THERMAL PLASMA TREATMENT APPARATUS, METHOD AND SYSTEM

BACKGROUND

This invention relates generally to agricultural production, and more specifically to non-thermal air or gas plasma technology as applied to and used for the treatment of liquids, seeds, and growth media for plants. The invention comprises an apparatus, method and system to treat various liquids, seeds, and soil or other growth media used in cultivating plants, including herbs, flowers, algae, trees, vegetables, and indoor and outdoor agricultural and medicinal crops (hereinafter plants) by exposure to a plasma discharge. A high voltage plasma discharge is generated using a novel electrode configuration in the presence of air or other oxygen and nitrogen containing gaseous mixtures, and is directed to one or more of the liquid, seeds or growth media utilizing removably attachable sub-assemblies. The method and system disclosed contemplates both wet and dry non-thermal plasma techniques.

Anhydrous Ammonia ($NH_3$) is the most widely produced chemical in the world. The predominant use of ammonia is as a nitrogen carrier for use in the agriculture industry, which relies heavily on nitrogen fertilization for domestic and international agricultural production. Traditional ammonia ($NH_3$) fertilizers provide a source of $NO_3$ which involves the process of nitrification to generate useful nitrogen for the plant. In this process, $NH_3$ in fertilizer must be exposed, under appropriate conditions, to ammonia-oxidizing bacteria such as *Nitrosomonas*, to provide benefit to plants. Ammonia is typically produced in a two-step process that first includes the steam reforming of natural gas into hydrogen ($H_2$) and carbon dioxide ($CO_2$). The second phase combines the hydrogen with nitrogen over an iron catalyst under great pressure and temperature. Over 2% of the world's total energy output is dedicated to the production of ammonia for fertilizer. The process is extremely energy intensive and produces millions of tons of unwanted $CO_2$ pollutants yearly.

In addition to the extreme cost and air pollution that results from ammonia-based fertilizer production, the widespread use and overuse of ammonia and other nitrogen fertilizers has significantly contributed to the high levels of pollution in the world's lakes, rivers and oceans. The run-off from the excess use of nitrogen fertilizers has choked many of the world's waters, polluting fisheries, recreation areas and drinking water. A new methodology is needed to limit or eliminate the unwanted $CO_2$ production and pollution from ammonia-based nitrogen fertilizers while allowing for the delivery of the reactive nitrogen needed by plants. Furthermore, a solution eliminating the steps to render fertilizer effective for nitrogen uptake by plants is needed that is further capable of producing $NO_2$ and high levels of $NO_3$ which could be directly taken up by plants without going through a mineralization or nitrification process.

Other important considerations in plant cultivation, especially in commercial production environments, include seed contamination and germination rates. Plasma and associated devices have been used for targeted microbial elimination, and also for seed coat surface treatments to enhance germination. Devices presently available generally involve the ability to only treat water, or seeds, but not both. Producers therefore have to make a large investment in multiple devices in order to utilize plasma for seeds and water.

Also, traditional irrigation methodologies involving spray application and flood irrigation result in nitrogen loss to the environment and wasteful runoff or evaporation depletion. It has been found that direct application of plasma-treated water or gas to the area of nitrogen uptake, generally the roots of the plant, can enhance growth significantly as well as conserve water and nutrients.

The invention disclosed herein offers a solution to the persistent problem of agricultural pollution in runoff from farms, ranches and other plant cultivation environments using ammonia-based fertilizer to supply usable nitrogen to plants. It provides a clean, safe and non-polluting source of nitrogen directly to plants, as they need it, in the form of metastable nitrogen and oxygen oxides, including NO, $NO_2$ and $NO_3$. In this form, nitrogen is supplied without mineralization or nitrification, which can result in saving valuable time and money. This invention further aids farmers and growers in a variety of settings by giving them the ability to treat seeds prior to sowing to eliminate seed surface pathogens, improve germination efficiency and harvest yield. The apparatus also provides the ability to produce and deliver a precise volume of plasma treated water which contains enhanced quantities of both reactive oxygen species (ROS) and reactive nitrogen species (RNS) directly to the plant root base when needed. The air and water treated by the apparatus within the system contains ROSs including Ozone ($O_3$), Atomic Oxygen (O) and Hydroxide (OH); and RNSs including $NO_2$ and $NO_3$ along with Nitric Oxide (NO), Nitrous Acid ($HNO_2$) and Nitric Acid ($HNO_3$). Targeted application and use of plasma treated products provides protection from pathogens and supplies readily available nitrogen sources, without the delay of having to go through a mineralization or nitrification process.

Plasma treatment systems and associated devices have been disclosed and used for a variety of applications, including water purification, chemical decontamination, and targeted microbial elimination. Plasma has also been disclosed as a means to treat seeds for various anti-microbial and agricultural purposes. Specifically, non-thermal plasma generator devices that chemically convert gaseous molecules found in air or water into higher value chemical compounds exist comprising various apparatus and configurations. They generally possess a high voltage plasma ignition system designed to create a plasma discharge. Each non-thermal plasma generator uses non-combustible gases such as oxygen, nitrogen or inert gases to establish the plasma discharge. However, no single apparatus is capable of providing treatment for liquid, seeds and growth media for enhanced plant production without chemical fertilizer. The present invention provides this capability, as well as producing significantly higher value liquid, seed and soil products through the processes and methods disclosed herein.

It is an object of this invention to provide a device and method for the treatment of water or other liquids used for irrigation as part of a system for nutrient delivery to plants.

It is a further object of this invention to generate ROS and RNS in a form deliverable and readily useable by plants for optimized growth and agronomic productivity when needed; the system enables growers to specifically alter the nutrient makeup, and therefore the nitrogen chemical efficacy of liquids supplied to plants with watering.

It is a further object of this invention to provide a method for the treatment of plant seeds in order to eliminate seed surface pathogens and improve germination efficiency and harvest yield.

It is a separate object of this invention to provide a system and method for the delivery of gasses and liquids containing ROS and RNS directly to plant root areas where they can be more efficiently assimilated.

It is a different object to optimize the water retention within a plasma reaction to generate liquids containing a high volume of ROS and RNS that are capable of accelerated absorption and use by plants.

It is another object of the invention to provide an apparatus and method within a water treatment system that allows for the on-site conversion of irrigation water into a carrier of highly valuable nitrogen oxides needed for healthy plant growth.

It is a separate object to provide a water treatment system that uses nitrogen and oxygen from atmospheric air or commercially available gas sources to produce the nitrogen required by plants, including commercial crops, making it far more environmentally friendly than other nitrogen and ammonia-based systems which require natural gas.

It is also an object to provide a single, integrated apparatus for the plasma treatment of water, seeds and soil or other growth media.

SUMMARY

The present invention discloses a single device that is adaptable for use as liquid, solid or gas treatment for optimization of plant growth with minimal or no added chemical nitrogen fertilizer. The device includes a novel porous plasma electrode which allows water to flow through it; this maximizes the plasma/water interface and residence time that the water is exposed to the plasma, significantly improving nitrogen concentration relative to presently known art. The purpose of the air plasma is for the creation of valuable reactive oxygen and nitrogen species (ROS and RNS) which are well known to be critical components in agriculture; they include Ozone ($O_3$), Atomic Oxygen (O) and Hydroxide (OH) as well as Nitrite ($NO_2$) and Nitrate ($NO_3$) along with Nitric Oxide (NO), Nitrous Acid ($HNO_2$) and Nitric Acid ($HNO_3$). The device and method disclosed specifically targets the production of $NO_2$ and $NO_3$, which are critical nutrients required for healthy plant growth. The plasma ionizes both oxygen and nitrogen, which results in the formation of metastable nitrogen oxides which include valuable NO, $NO_2$ and $NO_3$ gasses. These gasses are very stable if they are produced or stored at standard temperature and pressure but can decompose should there be adverse changes to either. Additionally, the invention's novel porous electrode design enables the ROS and RNS to liquesce with the water flowing through the electrode, thus greatly increasing the potential use for the water as a valuable carrier of disinfecting oxidizers and plant nutrients. The system will provide significant benefits within numerous sectors of the agricultural industry including plasma seed conditioning, enhancement of irrigation water and the ability to deliver both plasma activated water (PAW) and gasses directly to the plant root area. The plasma technology disclosed herein will have significant advantages over presently available methods of treating seeds as well as in-ground drip irrigation and root fumigation. Furthermore, it is compatible with hydroponic and aeroponic grow methods, as it is capable of the delivery of precise volumes of both ROS and RNS when they are needed. The technology requires minimal maintenance and utilizes minimal operating power. The treatment system requires very little power to operate; the present invention can treat up to 4 gallons an hour of water while using only 80-200 watts of electrical power.

The device, method and system presented generates both ROS and RNS that are capable of directly supplying useful nitrogen and oxygen species to plants. It is delivered by targeted application applied through watering, including hydroponic and aeroponic liquid application, and gas phase injection into growth media, which can include garden, field or commercial soil, perlite or vermiculite, planting or potting mixes, sharp sand, mulches, compost or other plant growth support material. The invention further aids growers by providing a method of utilizing the plasma discharge to alter seed physiology. The invention aids growers by providing the ability to make and deliver a precise volume of plasma treated gas and liquid containing both ROS and RNS directly to the seed, plant roots or a storage container, as needed. The system produces ROS, which can be in a gaseous state or dissolved into water, in both cases it can be delivered directly to treat seeds, transported to an irrigation water holding tank, delivered directly to ground plants via drip irrigation, mixed into water or other liquids used in hydroponics or sprayed onto the roots in an aeroponic system. The water and gas combination can also be delivered directly to the plant root area via means of a sub-surface injection system. The ROS include Ozone ($O_3$), Atomic Oxygen (O) and Hydroxide (OH). Each of these atoms and or compounds is considered a superior oxidizing agent in the fight against air, water and soil-based plant pathogens. These plant pathogens include but are not limited to fungi, molds, bacteria, algae and viruses. The ROS in the liquid not immediately used by plants is eventually dissolve into the irrigation water which raises the dissolved oxygen level, further benefiting plant growth. The system also produces RNS, which consist primarily of Nitrite ($NO_2$), Nitrate ($NO_3$), Nitric Oxide (NO), Nitrous Acid ($HNO_2$) and Nitric Acid ($HNO_3$). Each of these compounds play a specific role in optimizing plant health.

As a specific example, plasma treated liquid contains high levels of $NO_3$ in a form useful to plants as a nitrogen source. In order for plants to uptake nitrogen from fertilizers containing ammonia ($NH_3$), the $NH_3$ must first be converted into a more suitable form such as $NO_3$. In order for $NH_3$ to be converted into $NO_3$ it must first go through multiple chemical conversion steps that include oxidation from bacteria such as *Nitrosomonas* which converts $NH_3$ into $NO_2$. The next phase of the process is nitrification; in this process *Nitrobacter*-type bacteria oxidize the $NO_2$ into $NO_3$. The $NO_3$ is then taken up by the plant. Since the present invention produces $NO_3$ in high levels, this part of the nitrification process is avoided. All plants require a nitrogen source and are able to directly uptake $NO_3$ as their source of nitrogen. It is therefore an object of this invention to produce $NO_3$ and provide it as an immediately available nitrogen source for plants. The invention utilizes non-thermal plasma to produce high levels of $NO_3$ using an air or gas activated plasma discharge. Portions of the RNS and ROS produced in the plasma are able to pass through the system in a gaseous phase, which includes OH, $H_2O_2$, NO, $NO_2$, $HNO_2$ and $HNO_3$. Others are transported in a liquid phase and carried out with the water; they include OH, $H_2O_2$, NO, $NO_2$, $NO_3$, $HNO_2$, $HNO_3$, ONOOH, $H+$ and $OH-$. Both gas and liquid phase ROS & RNS exiting the non-thermal plasma unit are used to perform various functions using different embodiments of the invention. These functions include plasma seed treatment utilizing a specialized holding container mounted to the non-thermal plasma unit and supports the seeds while being exposed to chemical and electrical discharges exiting it. Another embodiment includes a discharge tube connected to the non-thermal plasma unit which is also connected to a gas diffuser positioned inside a tank containing irrigation water, another embodiment includes a discharge tube connected to the non-thermal plasma unit which is also connected to one or more tubes positioned to deliver both gas and liquid phase ROS & RNS directly to the roots of plants. While the invention can be configured to function solely with either of the three mentioned embodiments, it can also be configured to function with any two or all three.

While the mainstream method of producing nitrogen-based fertilizers involves the use of steam methane reformers, the present invention produces valuable ROS and RNS using only water, air and a very small electrical load to produce the plasma discharge. The entire process is done at ambient conditions and produces no harmful emissions in the process. Because the non-thermal plasma system only produces the exact volume of ROS and RNS needed at any given time there is virtually no loss due to leaching or other forms of run-off.

The present invention also provides distinct products by virtue of the process and method described herein. The system and method is distinct from the present art, where air is mixed with water prior to the two species entering the plasma unit together. With existing methodology, production of nitrogen rich water is less efficient than the system disclosed herein because the majority of the energy input required to reduce diatomic oxygen and nitrogen is spent on having contact time with the water instead of the air. The reduced or lost contact time also greatly reduces the potential to create long chain nitrogen species like NO2 & NO3.

The system herein described establishes a plasma field using only air or gas containing oxygen and nitrogen. Within the plasma field the diatomic oxygen and nitrogen are both reduced and oxidized to produce long chain species including but not limited to NO, NO2, NO3, HNO2, HNO3, O3, O and OH. Water is injected into the reaction zone after the production of the various species. A novel porous outer electrode in the reaction zone allows water to flow through apertures and come into contact with plasma filaments. This allows the plasma filaments to contact 100% of the water without any losses in plasma field strength. The porous electrode design ensures that the maximum volume of ROS and RNS are produced and transferred into the water. This method of producing nitrogen-rich water for agriculture results in a new plasma activated water product (PAW) with significantly higher levels of the desired plant nutrients, and therefore treatment efficiency when compared to other presently disclosed methods.

The seeds treated by the system and methods described herein are also a distinct product. Treated seeds have a significantly faster germination rate and growth rate. As a result of treatment with the system disclosed, the plasma activated seeds (PAS), as well as the plants which germinate and grow from those seeds, are a unique product in that they germinate more rapidly and show increased tolerance to water shortages and disease as a result of the device, method and process used within the invention's disclosed system.

This invention describes and discloses an apparatus as well as methodology used within the system claimed. The methods used with the device as part of the system are described, generally, in the following Detailed Description. One skilled in the art would appreciate that variations in steps designed to accomplish substantially the same function could be employed consistent with the invention disclosed herein.

DESCRIPTION OF THE REFERENCE NUMERALS IN THE DRAWINGS 100 plasma liquid, seed and growth media treatment system
101 plasma reactor vessel assembly
102 center electrode
103 center electrode insulator
104 plasma reactor housing
105 ignition connection hardware
106 gas inlet pipe
107 gas inlet passage
108 gas vortex chamber
109 gas acceleration zone
110 porous outer electrode
111 water injection port
112 electrode body
113 plasma ignition start point
114 plasma termination point
115 ignition feed-through rod
116 gas compression zone
117 upper insulator section
118 lower insulator section
119 ignition feed-through passage
120 insulator mounting area
121 water inlet passage
122 outer electrode water jacket
123 output channel hose
124 output channel reducer
125 hose clamp
126 reaction zone
128 discharge aperture
200 electrical system
201 system control unit
202 control power supply circuit
203 main power supply circuit
204 low voltage power circuit #1
205 low voltage power circuit #2
206 relay switch
207 air pump power line
208 ignition unit power line
209 air pump
210 plasma ignition unit
211 solenoid valve
212 high voltage ignition line
300 air supply unit
301 air filter
302 large air hose
303 Y-fitting
304 small air hose
400 water injection unit
401 external pressurized water supply line
402 manual shut-off valve
403 water flow regulator
404 water injection hose
405 T-fitting
500 liquid treatment system component
501 connection pipe
502 bulkhead adaptor
503 gas diffuser
504 contact vessel
505 overflow connection
600 seed treatment system component
601 seed treatment bag
602 draw string
603 seeds
700 growth media treatment system component
701 water-gas injection system
702 distribution tube
703 water-gas injector adaptor
704 injector adaptor
705 injector
706 water & gas outlet port 707 water
708 gas
709 connector valve

DESCRIPTION OF THE SEVERAL VIEWS OF THE DRAWINGS

FIG. 3 is a schematic representation of a tapered embodiment of the center electrode and feed through rod.

FIG. 4 is a schematic representation of the center electrode insulator.

DETAILED DESCRIPTION

Figure 1:
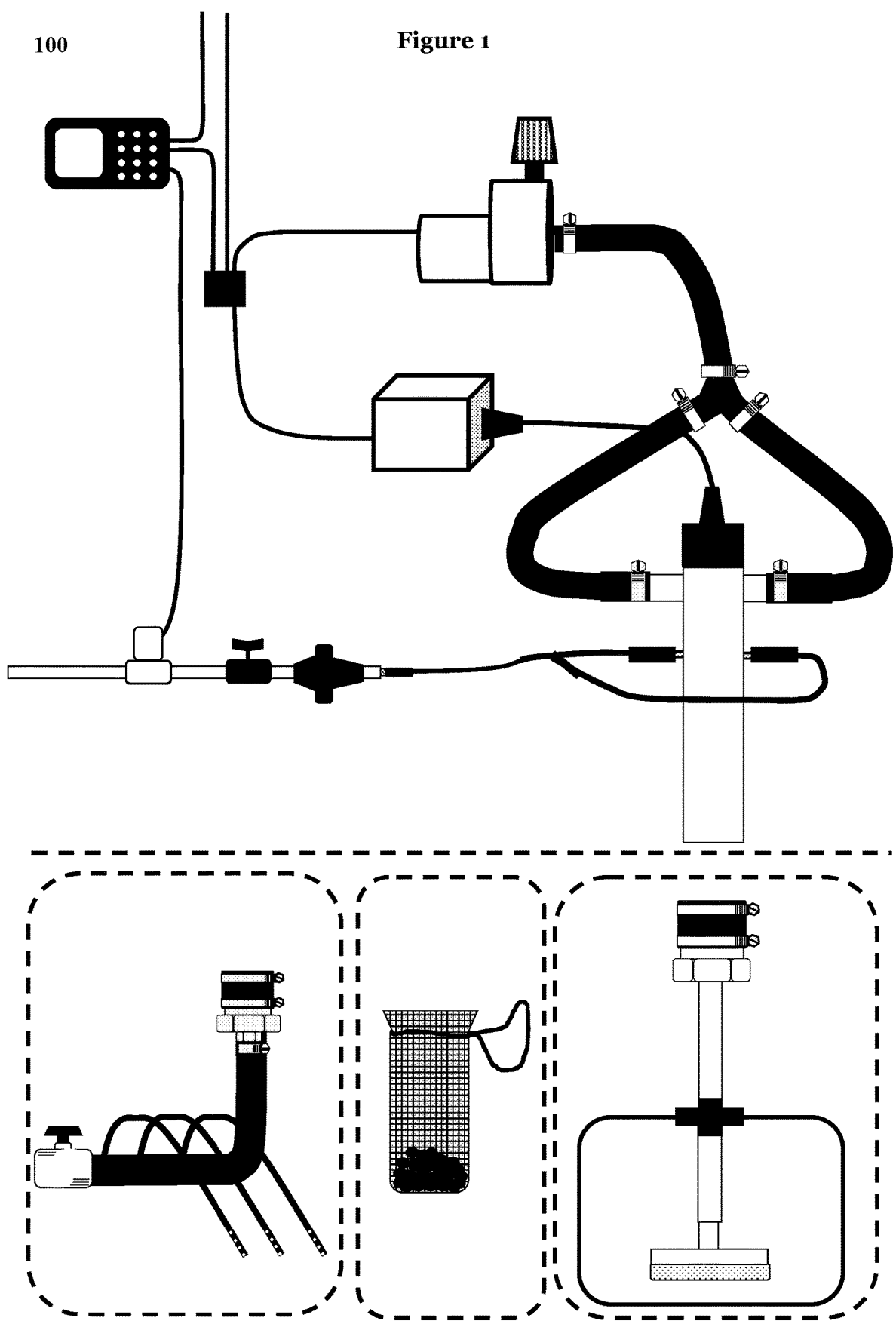
FIG. 1 is a schematic representation of the present invention with the interchangeable and removably attachable sub-assemblies for treatment of liquids, seeds and growth media.

Various aspects of the invention are shown in FIGS. 1-13. The invention disclosed is not limited to the illustrations presented; rather, the following description of the drawings is provided and is intended to explain the various embodiments of the inventive aspects and features described.

As shown in FIGS. 1-13, an integrated plasma liquid, seed and growth media treatment system 100 having a plasma reactor vessel assembly 101 is disclosed. The device used within the system enables a process for converting gases such as, but not limited to nitrogen and oxygen, from air and supplied to the plasma reactor vessel assembly 101 by the air supply unit 300, where it is converted into reactive oxygen and nitrogen species. One skilled in the art would appreciate that other appropriate gasses could be used within the system to generate the desired species. The plasma liquid, seed and growth media treatment system 100 and more specifically the plasma reactor vessel assembly 101 utilizes a high voltage electrical discharge supplied by the plasma ignition unit 210 to produce an air plasma between the center electrode 102 and the porous outer electrode 110. Water is supplied to the plasma reactor vessel assembly 101 from the water injection unit 400.

FIG. 1 is a schematic representation of the present invention with the interchangeable and removably attachable sub-assemblies for treatment of liquids, seeds and growth media using an improved non-thermal plasma reactor. This figure illustrates the system overall, and includes the various sub-assemblies, or removably attachable components for independent and exchangeable treatment of liquids, or seeds, or growth media. The embodiments for these distinct treatment types are shown and further detailed in the description below and drawings provided in FIGS. 2-13.

Figure 2:
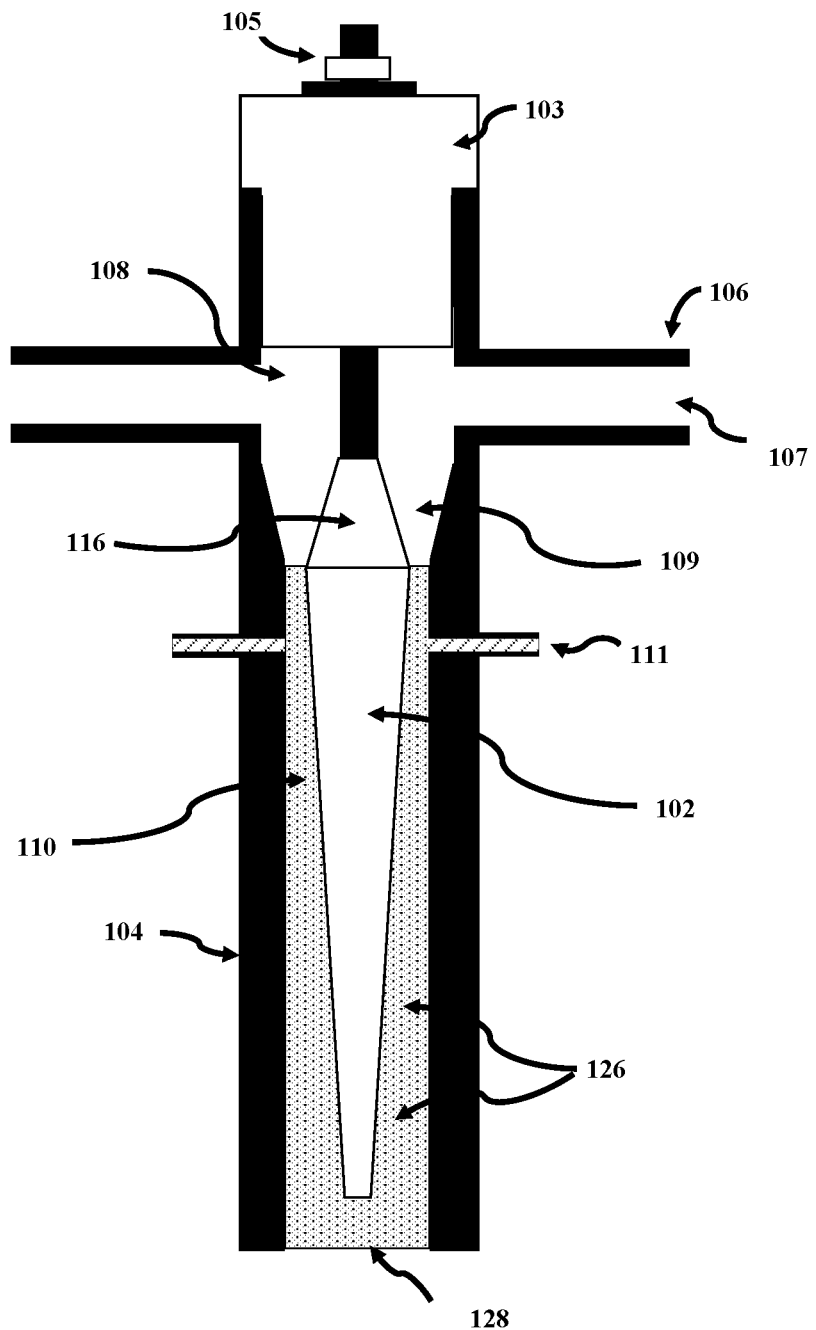
FIG. 2 illustrates the plasma reactor vessel assembly.

In FIG. 2, a plasma reactor vessel assembly 101 having a reaction zone 126 and porous outer electrode 110 is illustrated. The plasma reactor vessel assembly 101 is the central component used with each of the various treatment sub-assemblies, and is structurally consistent across all embodiments of the system. The various embodiments described include each of the liquid, seed and growth treatment system components used individually with the plasma reactor vessel assembly 101. The plasma reactor vessel assembly 101 includes a center electrode 102 which is affixed into a center electrode insulator 103. The center electrode insulator 103 mounts into the plasma reactor housing 104, which includes one or more gas inlet pipes 106, and one or more water injection ports 111 that supply water to a porous outer electrode 110. FIG. 2 shows the plasma reactor vessel assembly 101 individual parts, including a plasma reactor housing 104, center electrode 102, a center electrode insulator 103, gas inlet pipes 106, gas inlet passages 107, gas vortex chamber 108, gas acceleration zone 109, water injection ports 111, porous outer electrode 110, a reaction zone 126 and ignition connection hardware 105, as well as their structural relationships. In operation, high voltage is supplied to the plasma reactor vessel assembly 101 at the ignition connection hardware 105. The ignition connection hardware 105 is connected to the center electrode 102 and is insulated from the plasma reactor housing 104 by the center electrode insulator 103. Once the high voltage is supplied to the center electrode 102 a single point-to-point arc is established between the center electrode 102 and the porous outer electrode 110. The point-to-point arc remains in one location until an air or gas flow enters the system by way of one or more gas inlet passages 107. The air or gas flowing through the gas inlet passages 107 next enters the gas vortex chamber 108 where the air or gas is shaped into a spinning vortex. Air or gas within the gas vortex chamber 108 moves down and into the gas acceleration zone 109 where it gains speed. The gas acceleration zone 109 and the gas compression zone 116 together compress and shape the air or gas into a vortex traveling at high speed. The fast-moving air or gas continues to move down through the gas acceleration zone 109 and next passes into the reaction zone 126, which is the area between the center electrode 102 and the porous outer electrode 110, below the ignition start point and above the discharge aperture 128. As the air or gas passes between the center electrode 102 and the porous outer electrode 110, it comes in contact with the high voltage point-to-point arc located between the center electrode 102 and the porous outer electrode 110 which forms the arc into a rotating three-dimensional plasma field which extends the length of the reaction zone 126 and center electrode 102. Once the high voltage plasma field is established, water enters the plasma reactor housing 104 through the water injection ports 111 and into the outer electrode water jacket 122 (shown on FIG. 5) then through the porous outer electrode 110. Water entering the porous outer electrode 110 passes through its porous walls and into the reaction zone 126, where the three-dimensional plasma field is established. The inside surface of the porous outer electrode 110 is constructed to include a plurality of generally equally spaced and consistently sized apertures, such that the water flowing through the porous outer electrode 110 does not restrict its ability to form a plasma discharge because the surface is insulated by the water. In operation, water passing through the porous outer electrode 110 is forced against the inside surface of the porous outer electrode 110 that faces the center electrode where it pools on its porous surface. The apertures of the porous outer electrode 110 cover over 50% of its surface area, and enable water flowing over its surface to reside for relatively long periods of time compared to other presently disclosed systems, and thus maximize the contact time in which the water contacts the high voltage plasma discharge. The increased contact time enables increased and optimized production and concentration of the desired chemical species. Treated air and water exit the reaction zone 126 by next entering the discharge aperture 128. In embodiments utilizing the liquid treatment and growth media treatment components, an output channel hose 123 (shown in FIGS. 9 and 12) is removably attached to the plasma reactor housing 104. In the various embodiments presented, hose clamps 125 (shown in FIGS. 9 and 12) are used to attach hoses and tubes to the device; one skilled in the art would recognize that various other attachment means could be used and function without altering the disclosure presented herein. The plasma discharge exits the plasma reactor housing 104 through the discharge aperture 128 and is directed to one or more of the removably attachable sub-assemblies for liquid, seed or soil treatment.

FIG. 3 shows the center electrode 102 with its parts and spatial relationships to the device within the system. The center electrode 102 presented in this embodiment is generally diamond shaped and includes a long, tapered electrode body 112, which is generally cone shaped. The tapered electrode body 112 is vertically disposed within the device, and has a wide section at the top, at the plasma ignition start point 113 and a narrow section at the bottom at the plasma termination point 114. Located above the plasma ignition start point 113 is the gas compression zone 116. The gas compression zone 116 is a short cone shaped section. Attached to the top of the gas compression zone 116 is the ignition feed-through rod 115. The ignition feed-through rod 115 is threaded at the top so that the ignition connection hardware 105 (shown in FIG. 2) can be easily connected or disconnected. The bottom is welded or otherwise fixed to the gas compression zone 116. In operation, each part of the center electrode 102 performs a specific role. The ignition feed-through rod 115 is the electrical conduit that supplies the high voltage to the gas compression zone 116, the plasma ignition start point 113, the electrode body 112 and the plasma termination point 114. When air enters the plasma reactor vessel assembly 101 (shown in FIG. 2) it first swirls around the ignition feed-through rod 115; it next moves downward to the gas compression zone 116 where it increases in speed and pressure. At the bottom of the gas compression zone 116 is the plasma ignition start point 113. This is the closest point that the center electrode 102 comes in contact with the porous outer electrode 110 (shown in FIG. 2) and is where a point-to-point arc is formed. The plasma arc that is formed at the plasma ignition start point 113 is pushed by the moving air downward over the length of the tapered electrode body 112 and is terminated at the plasma termination point 114. In the embodiment presented, the tapered shape of the center electrode 102 and the spinning vortex of air enables production of a three-dimensional plasma discharge field within the reaction zone 126 (shown in FIG. 2).

As shown in FIG. 4, the center electrode insulator 103 is made from a non-conducting material and features an ignition feed-through passage 119 which allows the ignition feed-through rod 115 (shown in FIG. 3) to pass through without shorting to a nearby ground. The center electrode insulator 103 is further comprised of an upper insulator section 117 which mounts on top of the plasma reactor housing 104 (shown in FIG. 5). Below the upper insulator section 117 is the lower insulator section 118. The lower insulator section 118 mounts inside the plasma reactor housing 104 (shown in FIG. 2) and ensures that the center electrode 102 (shown in FIG. 2 and detailed in FIG. 3) is positioned in the center of the plasma reactor housing 104 which keeps it from shorting against a conductive surface. The center electrode insulator 103 is designed to press into the plasma reactor housing 102 in such a way that it ensures that the center electrode 102 is correctly lined up so that the plasma ignition start point 113 (shown in FIG. 3) is nearest to the top of the porous outer electrode 110 (shown in FIG. 2).

Figure 5:
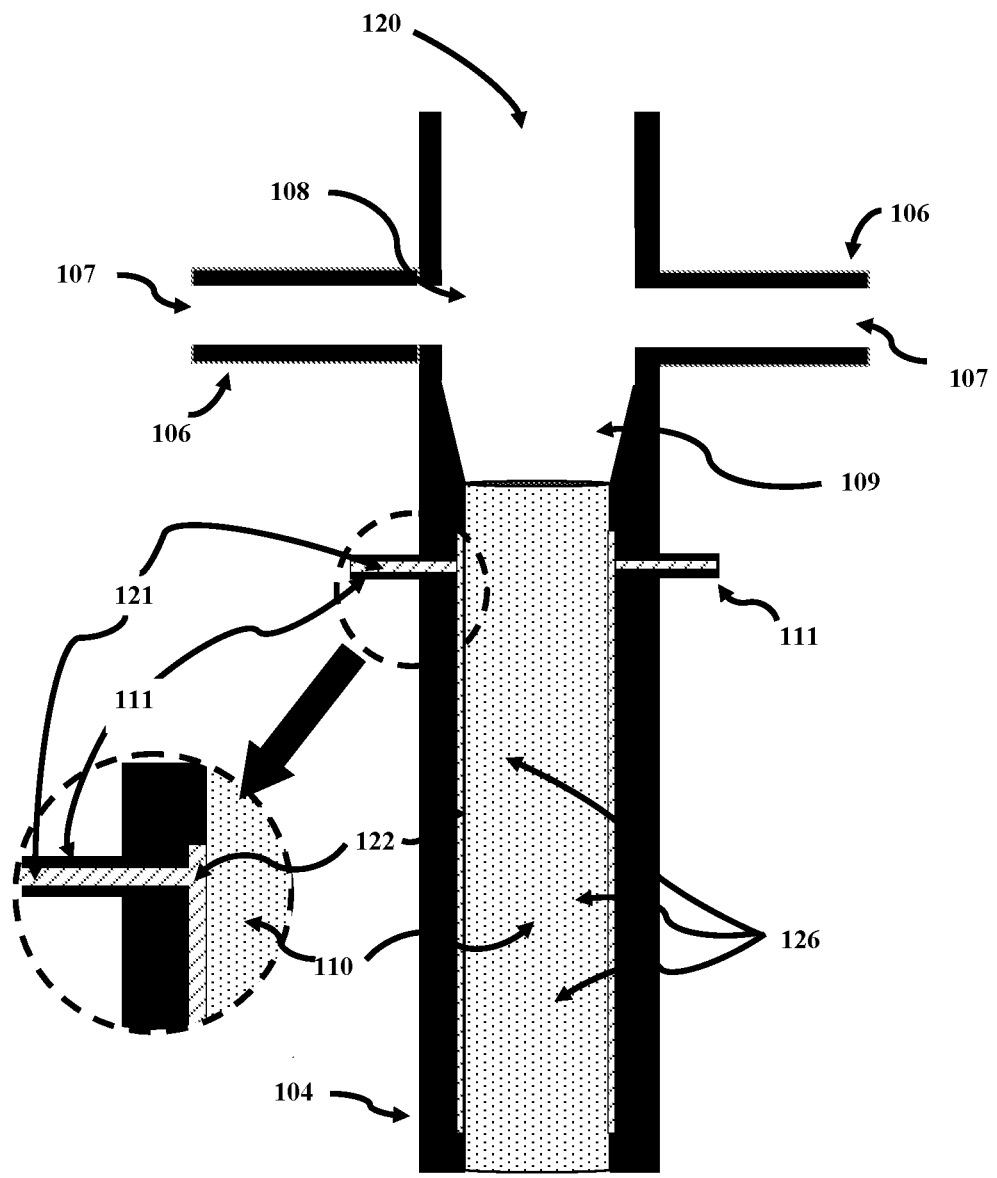
FIG. 5 is a schematic representation of the plasma reactor housing including an exploded view of a water inlet port and water passage within the plasma reactor housing.

FIG. 5 shows the plasma reactor housing 104 and an exploded view of the water injection port and water inlet passage 121 and the connection to the outer electrode water jacket 122 and porous outer electrode 110, and details the relationship between its parts, including one or more gas inlet pipes 106, gas inlet passages 107, gas vortex chamber 108, gas acceleration zone 109, insulator mounting area 120, water injection ports 111, water inlet passage 121, porous outer electrode 110, an outer electrode water jacket 122 and a reaction zone 126. The plasma reactor housing 104 is specifically designed to provide multiple functions using a single architecture including support of the center electrode 102 (shown in FIG. 3) and the center electrode insulator 103 (shown in FIG. 4), the positioning of the gas inlet pipes 106, the gas inlet passages 107, the gas vortex chamber 108 and the gas acceleration zone 109 ensure the creation of a high speed spinning vortex of air which is needed to elongate the point-to-point arc formed between the center electrode 102 and the porous outer electrode 110 in the reaction zone 126. The water injection ports 111 and connected water inlet passages 121 allow water to enter the outer electrode water jacket 122 which is located between the plasma reactor housing 104 and the porous outer electrode 110. Water entering the outer electrode water jacket 122 next passes through the porous outer electrode 110 and into the reaction zone 126. In operation water passing through the porous outer electrode 110 does so in such a way that it does not obstruct or restrict the three-dimensional plasma field but rather enables all of the water to contact the plasma field; this sustained water-plasma contact greatly increases the overall efficiency of production and concentration of the desired chemical species relative to presently disclosed related art.

Figure 6:
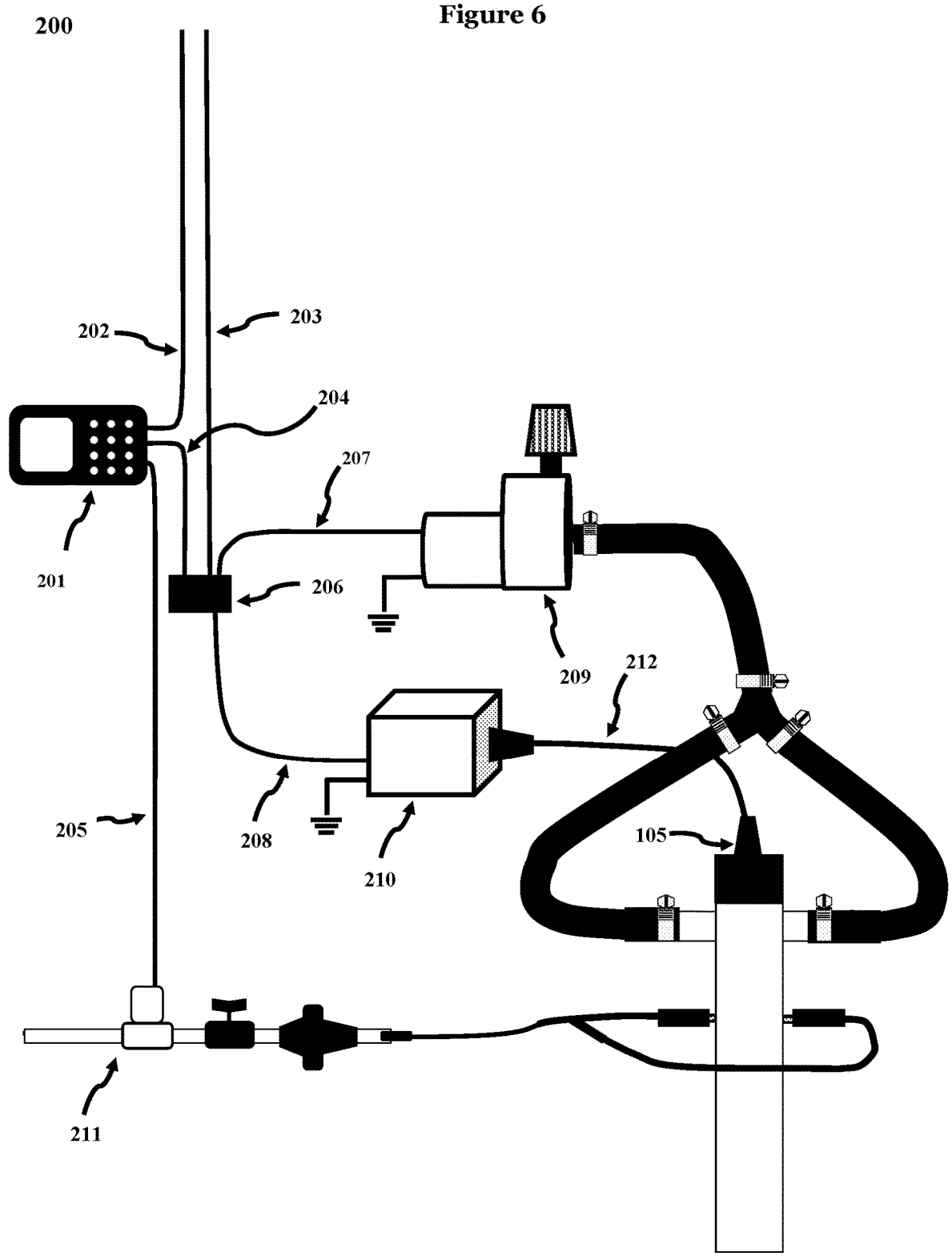
FIG. 6 is a schematic representation of the disclosed electrical system, water injection and plasma ignition units, and attached system control unit.

FIG. 6 shows the electrical system 200, which consists of a system control unit 201, control power supply circuit 202, a main power supply circuit 203, a first low voltage power circuit 204, a second low voltage power circuit 205, relay switch 206, an air pump power line 207, an ignition unit power line 208, air pump 209, plasma ignition unit 210, solenoid valve 211 and a high voltage ignition line 212. The purpose of the electrical system 200 is to provide and manage electrical power to the various components used with the integrated plasma liquid, seed and growth media treatment system 100 (shown in FIG. 1). In operation the control power supply circuit 202 and main power supply circuit 203 are connected to an external power supply such as a wall outlet or breaker box. Valves controlling the flow of water, liquids, air or gasses can be manually adjusted or electronically controlled through an interface on the system control unit 201. The control power supply circuit 202 connects to the system control unit 201. The system control unit 201 can be but is not limited to any of the following control types or system functionality: operation of the compressor for providing the flow of air or gas to air to the system, plasma ignition unit controls for providing and regulating electrical energy to the plasma reactor vessel assembly, controlling the operation of the electronic valve for opening or closing the flow of water to the plasma reactor vessel assembly, programmable logic control, microprocessor control, PID control, manual or automatic control actuation, or functionally equivalent controls. Also, timing for automatic operational activation and shut-off control can be programmed by a timing device, which is actuated by the system control unit and is programmable for operation of the system in one or more of the water system component, seed treatment system component, and soil treatment system components. The system control unit 201 may utilize one or more human interfaces including a touch screen, push-button, rotary dial, or similarly functioning interface, and a preferred embodiment further includes remote access to system controls via Wi-Fi, Bluetooth and cellular data. In this embodiment, the system control unit 201 features a microprocessor control that has an internal power converter that reduces 120 or 240 VAC line voltage to 24 VAC. The system control unit 201 in FIG. 6 also features a touch screen interface which allows the operator to select a specific start and stop time and duration of operation, select the mode of operation such as water treatment or seed treatment.

The system control unit 201 may additionally be configured to operate more than one treatment system, and may utilize an assortment of inputs from monitoring sensors. Connected to the system control unit 201 is a first low voltage power circuit (#1) 204. When the system control unit 201 is operated, it energizes the low voltage power circuit #1 204 which in turn energizes a relay switch 206. The relay switch 206 connects directly to the main power supply circuit 203 which is also connected to an external power supply such as a wall outlet or breaker box. When the relay switch 206 is energized by the low voltage power circuit #1 204, it completes the circuit and in turn energizes both the air pump power line 207 and the ignition unit power line 208. With both the air pump power line 207 and the ignition unit power line 208 energized, power is supplied to the air pump 209 and engages the plasma ignition unit 210. Once energized, the air pump 209 immediately supplies compressed air to the air supply unit 300 (shown in FIG. 7). The plasma ignition unit 210 also becomes energized, which in turn provides high voltage power to the high voltage ignition line 212, which is connected to the ignition hardware 105 (shown in FIG. 2). The plasma ignition unit is configured to operate at either a set voltage and frequency or at an oscillating voltage and frequency. The plasma ignition unit 210 is interchangeable with numerous types of ignition systems which could modify the voltage type to AC or DC, utilize a wide range of voltages from 3 kV to 18 kV as well as to modify the voltage frequency from 50 Hz to >50 kHz without affecting the overall functionality of the device. Also connected to the system control unit 201 is a second low voltage power circuit (#2) 205. This low voltage power circuit #2 205 is connected to the solenoid valve 211. When the system control unit 201 is powered on it energizes the low voltage power circuit #2 205 which in turn energizes the solenoid valve 211. The solenoid valve 211 uses electrical power to open and close the flow of water entering the water injection unit 400 (shown in FIG. 8).

Figure 7:
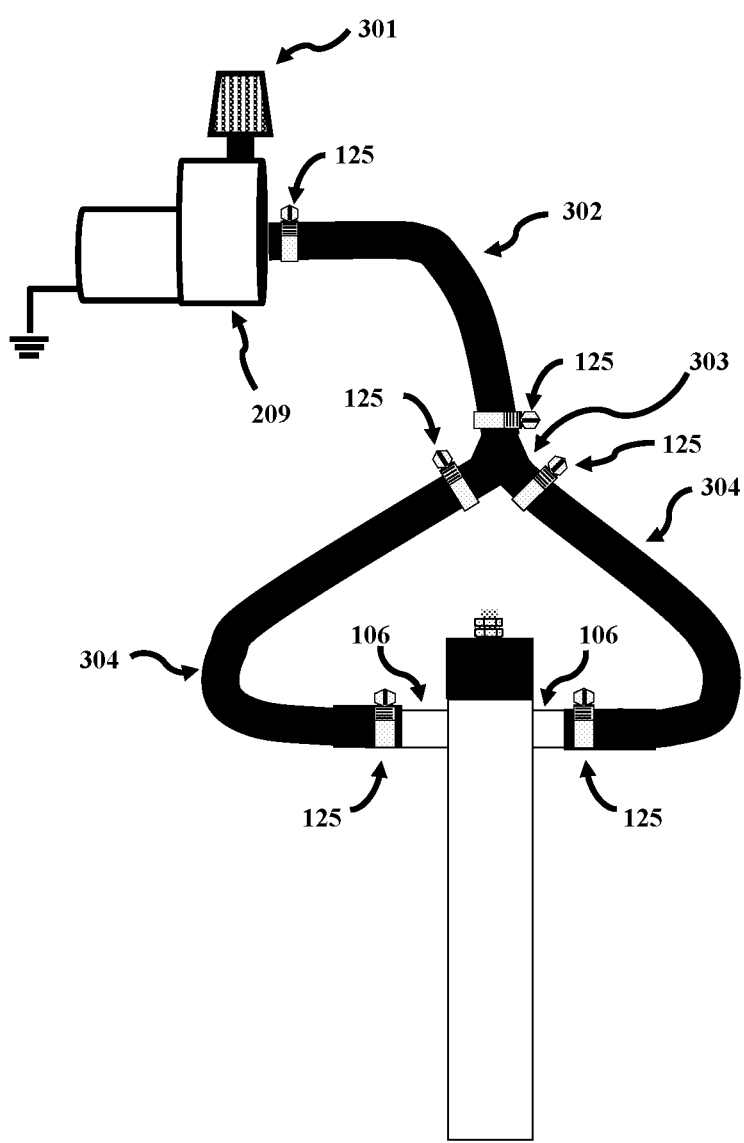
FIG. 7 is a schematic representation of the air supply unit and components.

FIG. 7 shows the air supply unit 300, which comprises an air pump 209 that may be 110 volt or 240 volt AC or 12 volt or 24 volt DC powered. This may be adaptable to voltages used in other countries. In a preferred embodiment an air filter 301 is connected to the air pump. A variety of air or gas pump and filtration devices could be used to provide a filtered and pressurized source of reactive species to the system and are contemplated herein. Large air hose 302, Y-fitting 303, small air hoses 304, and hose clamps 125 are also depicted. The air supply unit 300 is designed to compress air or gas and supply it to the plasma reactor vessel assembly 101 (shown in FIG. 2). In operation the system control unit 201 (shown in FIG. 6) is engaged, and energizes the air pump 209. The air pump 209 then compresses air or gas by drawing it in through the air filter 301 which filters out any airborne dust and particles that might do harm to the air pump 209. The compressed air or gas next exits the air pump 209 via the large air hose 302 which is securely and removably attached to the air pump 209. In the depicted embodiment, and as used in the following description, a hose clamp 125 is utilized to attach the parts, however other appropriate means of secure attachment are contemplated. The compressed air or gas traveling through the large air hose 302 next comes in contact with the Y-fitting 303 which is secured to the large air hose 302 with a hose clamp 125. The Y-fitting 303 divides the compressed air or gas into a plurality of diverging, specific channels which are connected to the small air hoses 304 and are secured together using hose clamps 125. The small air hoses 304 are in turn connected to the gas inlet pipes 106, and secured using hose clamps 305.

Figure 8:
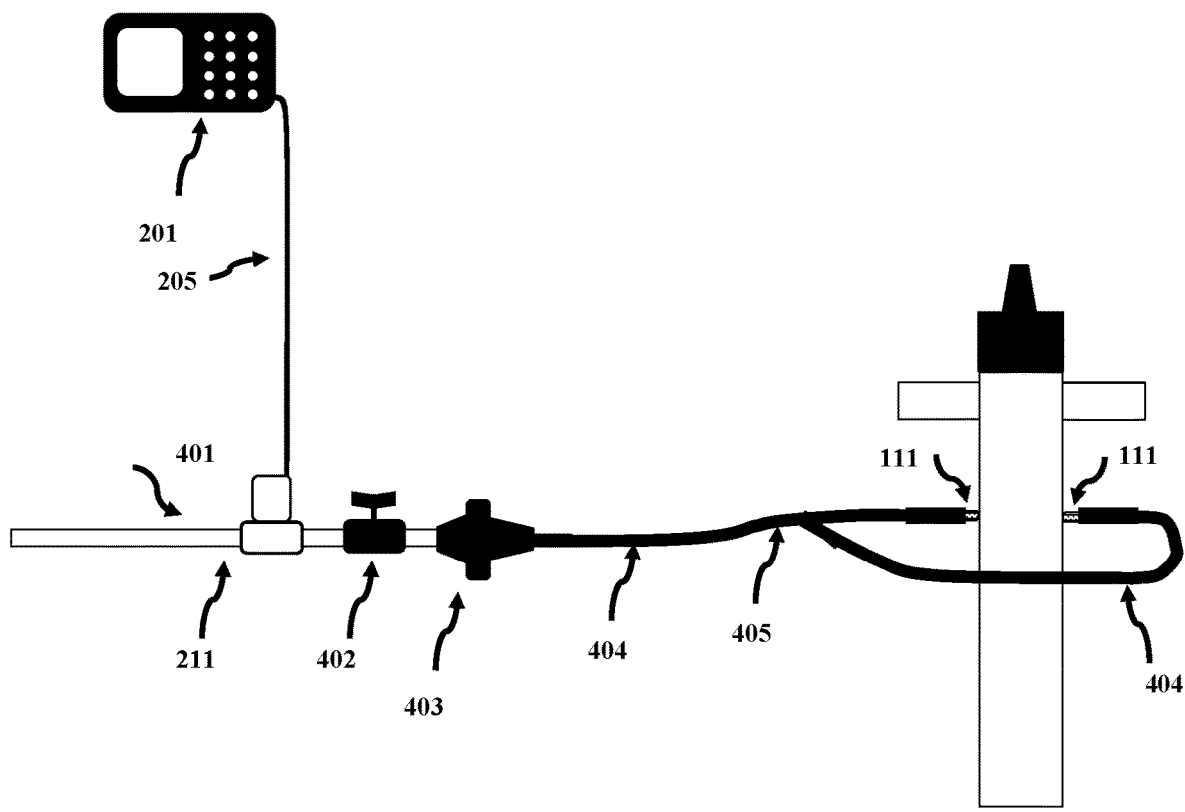
FIG. 8 is a schematic representation of the water injection system, flow regulating and supply components having a pressurized water supply source, electronic valve and flow regulator.

FIG. 8 shows the water injection unit 400, which consists of one or more water injection ports 111, an external pressurized water supply line 401, a solenoid valve 211, manual shut-off valve 402, water flow regulator 403, water injection hose 404, T-fitting 405, water treatment system control 201 and a low voltage power circuit #2 205. The water injection unit 400 is designed and configured to control the flow of water from an external pressurized water supply line 401 to the plasma reactor vessel assembly 101 (shown in FIG. 2). In operation the water injection system 400 is controlled from the system control unit 201. When operated, the system control unit 201 energizes the low voltage power circuit #2 205 which in turn energizes the solenoid valve 211, allowing water to flow from the external pressurized water supply line 401. When the solenoid valve 211 is energized water flows through it and past the manual shut-off valve 402 which is used to secure the water from flowing should the solenoid valve 211 fail to close. Connected to the manual shut-off valve 402 is the water flow regulator 403. The water flow regulator 403 reduces the pressure of the incoming pressurized water and regulates the flow to a specific flow volume which ensures that all the water treated with plasma has the same chemical consistency. Connected to the water flow regulator 403 is one or more water injection hoses 404 which carry the water to a T-fitting 405. The T-fitting 405 is used to create additional paths for the one or more water injection hoses 404 so that they can connect to more than one water injection port 111.

Figure 9:
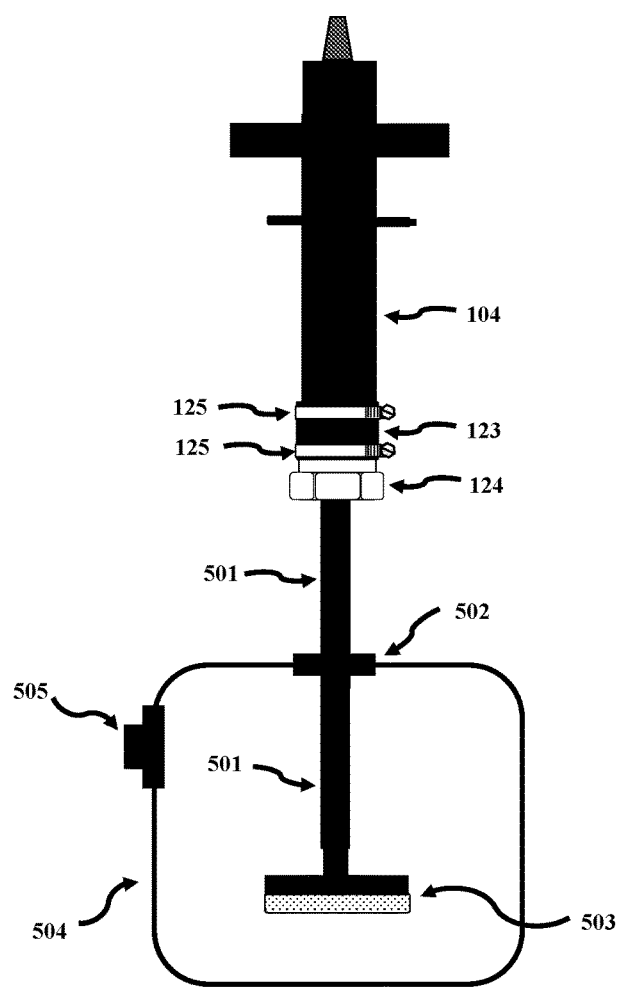
FIG. 9 is a schematic representation of the liquid treatment system component, connectors, pipes and gas diffuser.

FIG. 9 illustrates the liquid treatment system component 500 and its attachment to the plasma reactor vessel assembly 101 (shown in FIG. 2). In this aspect of the system, liquids are treated with plasma before it is released from the discharge aperture utilizing the device as described in FIGS. 1-8 to produce the desired metastable nitrogen and oxygen species, and then are run through a sub-assembly for liquid treatment to further incorporate them into the liquid. This liquid treatment sub-assembly is removable and interchangeable with seed or growth media treatment sub-assemblies. It consists of a contact vessel 504, connection pipe 501, bulkhead adaptor 502, gas diffuser 503, overflow connection 505, plasma reactor housing 104, output channel hose 123, output channel reducer 124 and hose clamps 125. The liquid treatment system component 500 is configured in such a way that both liquids and gasses exiting the plasma reactor housing 104 are mixed together in order to dissolve the majority of gaseous chemical compounds created in the plasma into the liquid. In operation both gasses and liquids discharged out the bottom of the plasma reactor housing 104 would enter the output channel hose 123 which is fixed to the plasma reactor housing 104 using a hose clamp 125. The output channel hose 123 is connected to the output channel reducer 124 and secured together using a hose clamp 125. The output channel reducer 124 is configured to reduce the size of the output channel hose 123 so as to connect with the connection pipe 501. The connection pipe 501 has a male pipe thread on one or both ends, which allows it to connect to the output channel reducer 124 that has a matching female pipe thread by screwing them together. The connection pipe 501 passes through a bulkhead fitting 502 which mounts to the top of the contact vessel 504. The bulkhead fitting 502 is designed to fix the connection pipe 501 at a set height by clamping down on the exterior of the connection pipe 501 thus restricting its ability to move. Connected to the bottom end of the connection pipe 501 is the gas diffuser 503. The gas diffuser 503 is located inside the contact vessel 504 and connected to the connection pipe 501. The bottom of the connection pipe 501 has a female pipe thread that allows it to connect to the gas diffuser 503 which has a matching male pipe thread by screwing them together. The gas diffuser 503 is positioned close to the bottom on the inside of the contact vessel 504. Mounted to the side and near the top of the contact vessel 504 is the overflow connection 505. The overflow connection 505 is positioned to allow water entering the contact vessel 504 to exit into a larger holding or storage tank (not included with this system). In operation both water and air or gas exit the gas diffuser 503 and move into the contact vessel 504. Air or gas entering the contact vessel 504 exit through the overflow connection 505 which is connected to a holding or storage tank (not included with this system) which is vented to atmosphere. Water entering the contact vessel 504 is allowed to fill the contact vessel 504 up to the height of the overflow connection 505; once the contact vessel 504 is full the water is allowed to flow out through the overflow connection. With the contact vessel 504 full of water the gas diffuser 503 plays a much more significant role by releasing micro-bubbles containing reactive oxygen and nitrogen compounds into the water. As the micro bubbles rise to the surface of the water a large portion of these reactive compounds are dissolved into the water which greatly improves overall system efficiency and the concentration of the desired chemical species within the water. In this aspect of the system, concentrations of nitrate can be achieved in excess of 500 parts per million. In an alternate embodiment, the water treatment system includes a method of recirculating water from the contact vessel 504 back into the into the water injection system 400 (shown in FIG. 8) using a series of pumps, valves, fittings and hoses. Recirculating the water in this manner further enriches the water with the desired chemical species, and results in concentrations of nitrate in excess of 800 parts per million.

Figure 10:
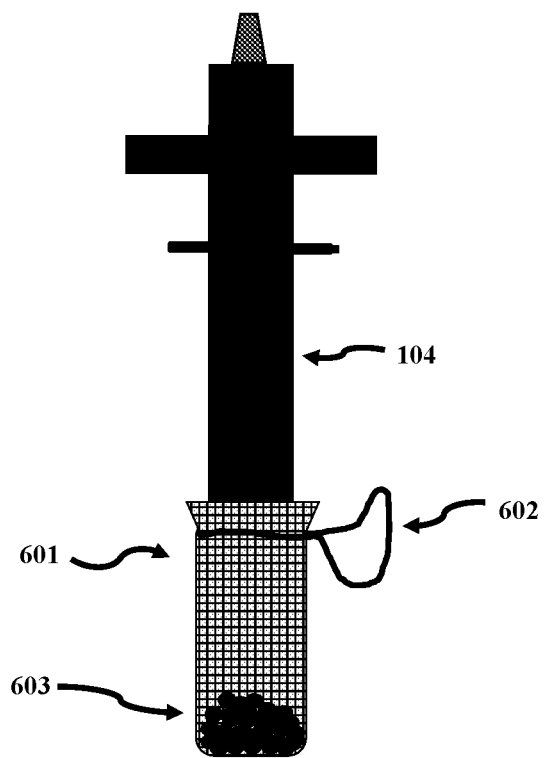
FIG. 10 is a schematic representation of the seed treatment system component.

FIG. 10 illustrates the seed treatment system component 600 and its attachment to the plasma reactor vessel assembly 101. In this aspect of the system, seed are treated with plasma after it is released from the discharge aperture utilizing the device as described in FIGS. 1-8. The purpose of the plasma seed treatment system 600 is to expose plant seeds 603 (not included with this system) to the oxidation and ionization aspects associated with a high voltage plasma discharge. Seeds 603 that have been directly exposed to plasma are found to be sterilized of surface pathogens and have had the outer layer of the seed, also referred to as the husk, become etched by the plasma discharge which leads to vastly improved permeability and water uptake. The end result is improved plant health, improved harvest yield, increased germination and growth rate efficiency relative to presently disclosed related art. The seed treatment system component 600 consists of the plasma reactor housing 104, a seed treatment bag 601 with a closure; in one embodiment a draw string 602 is used to close the seed treatment bag 601. In operation the seed treatment system 600 is controlled from the system control unit 201 (shown in FIG. 6). When engaged, the system control unit 201 energizes various components referenced in FIGS. 6, 7 & 8 resulting in a discharge of plasma-enhanced water and gas species exiting the bottom of the plasma reactor housing 104 and entering the seed treatment bag 601 for conditioning of the seeds 603. The seed treatment system component 600 can be operated with or without water to provide both wet and dry non-thermal plasma treatment depending on the desires of the system operator. Water can be included, or excluded by selecting the appropriate option on the system control unit 201.

Figure 11:
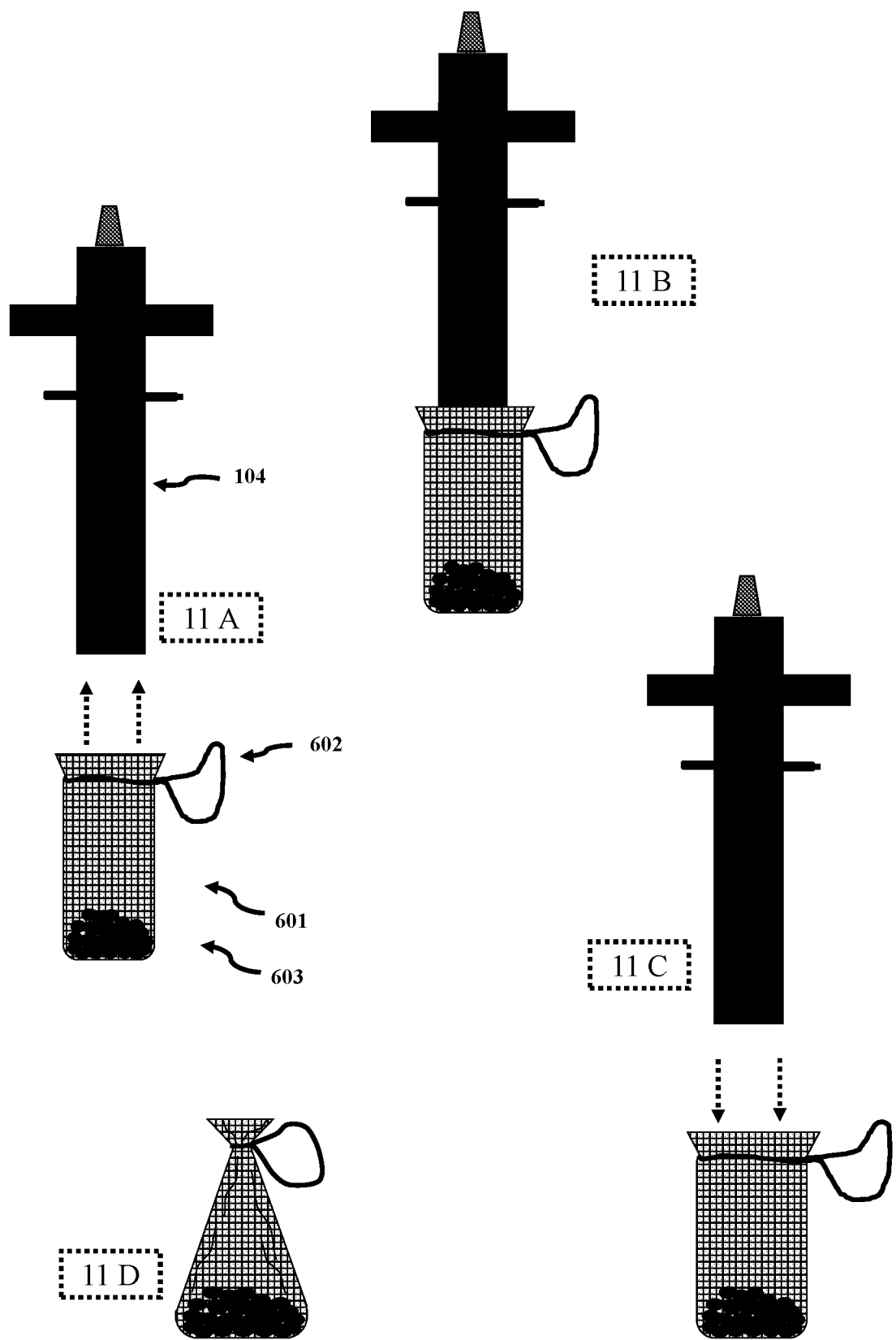
FIG. 11 is a schematic representation illustrating the process of installing and removing a seed treatment bag from the disclosed apparatus.

FIG. 11 illustrates the step by step use of the plasma seed treatment system 600 and in particular the use of the seed treatment bag 601, although other container types for holding the seeds are contemplated. In 11(a) a seed treatment bag 601 is loaded with seeds 603. In 11(b) the seed treatment bag 601 is coupled with the plasma reactor housing 104, and the closure such as a draw string 602 closes an opening in the seed treatment bag 601 around the plasma reactor housing 104. In this configuration, air or gas and water released from the discharge aperture 128 can contact the seeds 603. Once this is done the seed treatment system component 600 can be operated as discussed in FIG. 10. After operation of the plasma seed treatment system 600 the seed treatment bag 601 is removed from the plasma reactor housing 104 as shown in Step 3. In step 4 the closure such as a draw string 602 is used to close the top of the seed treatment bag 601. Alternative embodiments may include various seed treatment containers having various connection systems to the plasma reactor housing 104.

Figure 12:
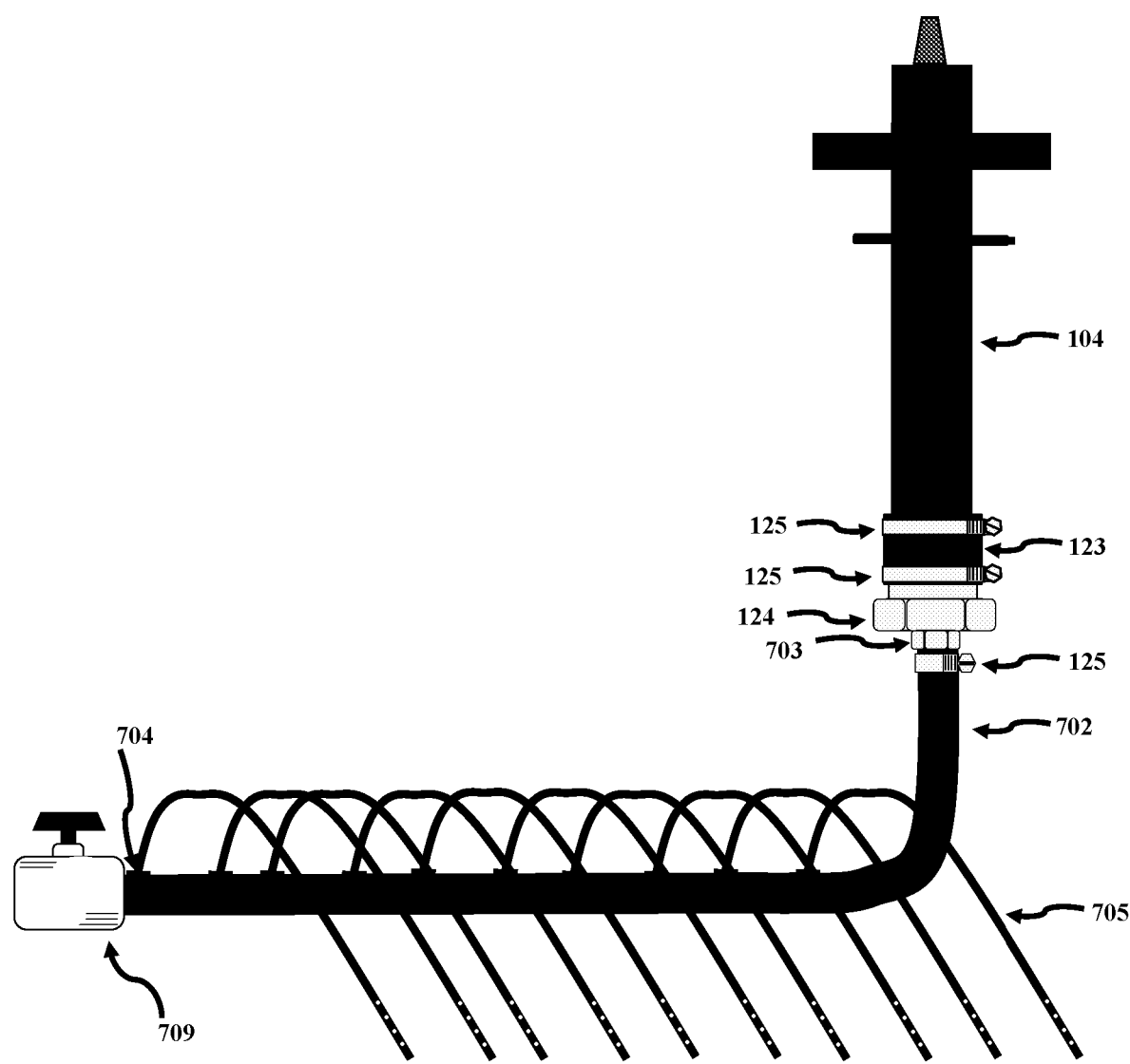
FIG. 12 is a schematic representation of the growth media system component.

FIG. 12 is a schematic representation of the growth media treatment system component 700. This sub-assembly of the system is designed to deliver both gas and liquid components exiting the plasma reactor housing 104 to a transport system designed to inject them into the soil or other growth media around a plants root area. Further, the growth media treatment system component 700 provides valuable nitrogen compounds such as but not limited to NO3 directly to the target crop with little or no losses due to denitrification or leaching. The growth media treatment system component 700 also delivers reactive oxygen compounds such as but not limited to O3 and OH to root areas where they are used to improve soil fertility and root health. The growth media treatment system component 700 includes the plasma reactor housing 104, output channel hose 123, hose clamps 125, output channel reducer 124, water-gas injection system 701, distribution tube 702, water-gas injector adapter 703, connector valve 709, injector adaptor 704 and injector 705. When operated the system control unit 201 (shown in FIG. 6) energizes various components referenced in the Figures which enable the discharge of plasma-enhanced water and gas species to exit the bottom of the plasma reactor housing 104 at the discharge aperture 128. Connected to the bottom of the plasma reactor housing 104 is the output channel hose 123 which is secured to the plasma reactor housing 104 with a hose clamp 125. Both water and gas flow through the output channel hose 123 and next enter the output channel reducer 124 which has a smaller female pipe connection on the bottom side. The output channel reducer 124 is secured to the output channel hose 123. The water-gas injection adapter 703 which has a male pipe thread screws into the female thread on the bottom of the output channel reducer 124. The water-gas injection system 701 also has a hose barb on the opposite side from the male pipe thread which allows the distribution tube 702 to connect to it. The distribution tube 702 is secured to the water-gas injection system 701. The distribution tube 702 transports both gas and liquids exiting the plasma reactor housing 104 to the target plant where it can be next transported to the root area of the target plant via the injector 705. In one embodiment, the distribution tube 702 is made of plastic, but it could be made of any suitable material. Furthermore, it can be a single structure of any practical dimension, and can vary from as little as one (1) foot in length to several hundred feet in length. Alternatively, the distribution tube 702 can be a series of many tubes connected together using a distribution manifold. In all cases, one or more injector adaptors 704 are connected to the distribution tube 702. The injector adaptors 704 are made from plastic, metal, or other suitable materials; they are designed to be mounted into the distribution tube 702 and surround apertures in it. Connected to the injector adaptor 704 is the injector 705, which in a preferred embodiment comprises a hollow plastic tube that connects to the injector adaptor 704 by pushing it over the outside surface of the injector adaptor 704. The injector 705 is configured to allow the flow of gas and water passing through the injector adaptor 704 to flow through it as well and on to the target crop. Fixed to the end of the distribution tube 702 is the connector valve 709. The connector valve 709 has a slip-on hose connection on both sides of it and a ball valve in the middle, and it is configured to clamp to the surface of the distribution tube 702. This connector valve 709 is intended to either allow the flow of gas and liquid to flow through it or to shut off the flow of gas and liquid. Additional lengths of distribution tube 702 can be added to the connector valve 709 so as to treat additional plants.

Figure 13:
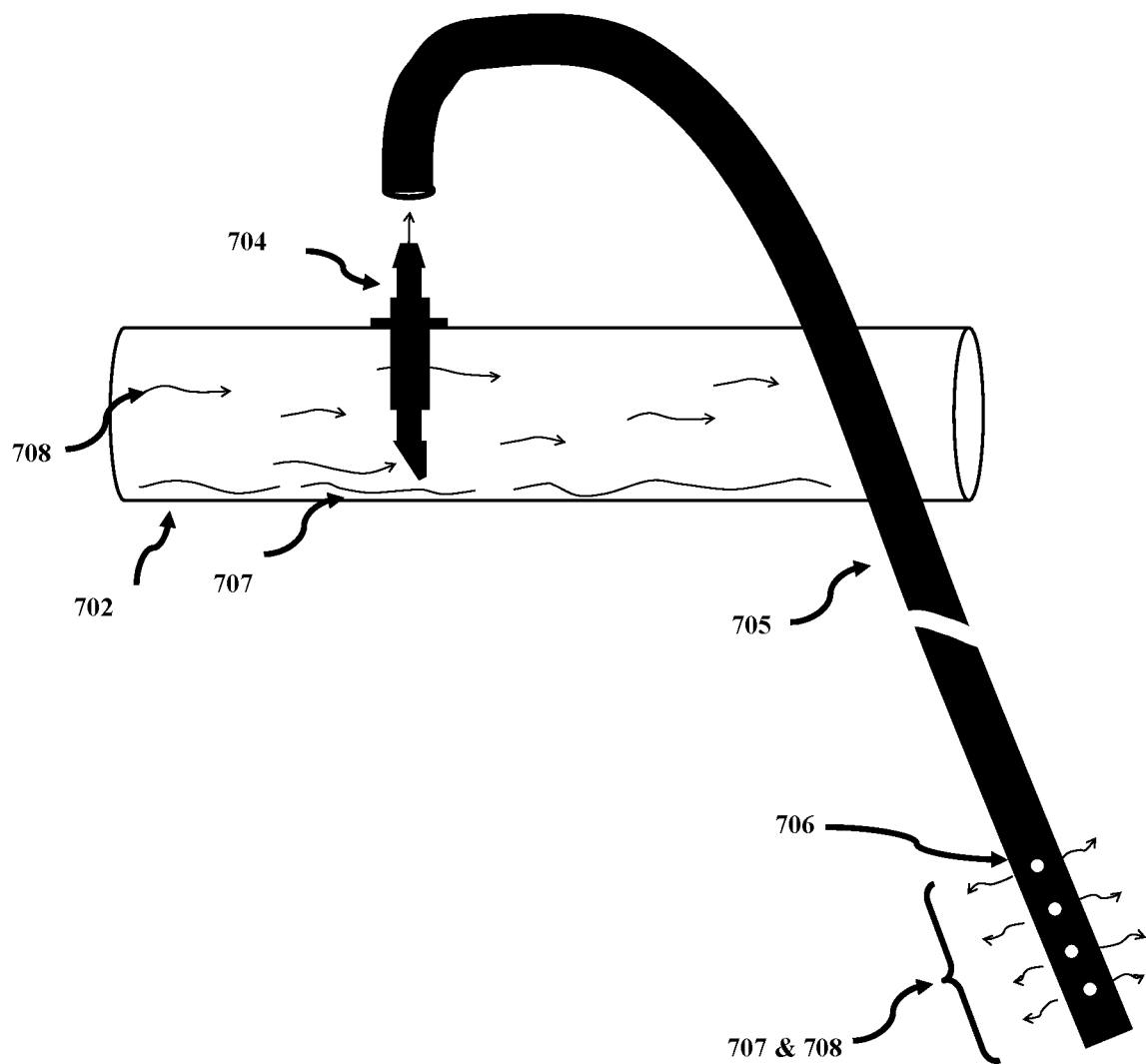
FIG. 13 is a schematic representation of the growth media system component distribution tube and injectors used with an aspect of the invention configured to transport and inject water and gasses into soil or growth media.

FIG. 13 is a detailed illustration of parts within the growth media treatment system component 700, specifically the water-gas injection system 701. A distribution tube 702 is shown which carries both gas 708 and water 707 that has exited the plasma reactor housing 104 (shown in FIG. 5). As the gas 708 and water 707 move through the distribution tube 702, the water 707 moves along the bottom of the distribution tube 702 and the gas 708 moves above it. Connected to the distribution tube 702 is the injector adaptor 704, which is configured to allow both gas 708 and water 707 to flow through it at the same time; further, it is positioned in the distribution tube 702 in such a way that it ensures that both the gas 708 and water 707 both flow through it at all times during operation. Connected to the injector adaptor 704 is the injector 705 which is a hollow tube that is open at the top end and is sealed at the bottom end. The injector 705 has a plurality of water and gas outlet ports 706 which allow both gas 708 and water 707 to exit into the soil or other grow media.

The methods used with the device as part of the system are described, generally, in the following summarized description. One skilled in the art would appreciate that variations in steps described here and in the following claims that are designed to accomplish substantially the same function could be employed and still be consistent with the invention disclosed herein.

Operating the Non-Thermal Plasma Treatment Apparatus:

The method for non-thermal plasma treatment of liquid, seeds and soil involves generating plasma in a plasma reactor vessel assembly 101 and releasing it through a discharge aperture 128 in the assembly. The plasma discharged in this way is then directed to one or more sub-assemblies capable of treating specific materials, products or elements and changes their chemical properties. The system is engaged by powering it on through a system control unit 201 capable of actuating and regulating system functionality and selecting the desired functional settings, and electricity is provided to the system through the apparatus's electrical system 200. A pressurized external flow of air or gas is then supplied to the apparatus through the apparatus's air supply unit 300. The system is capable of treating liquid, sees or growth media in either wet plasma or dry plasma configuration. If wet plasma treatment is desired, water is supplied through the apparatus's water injection unit 400; if not, this can be bypassed by appropriate control selection on the system control unit 201. Next, the plasma ignition unit 210 is actuated at the plasma ignition start point 113. As electricity, gasses and water (in the case of the wet plasma configuration) flow through the reaction zone 126, a three-dimensional plasma field is generated within the apparatus's plasma reactor vessel assembly. This plasma field is directed to the discharge aperture 128, where it is released to one or more of a liquid treatment system component, seed treatment system component, or growth media treatment system component sub-assembly or assemblies to treat one or more of liquids, seeds or growth media by removably connecting the desired sub-assembly to the plasma reactor vessel assembly 101. Treatment is then accomplished by exposing one or more of the liquid, seed or growth media to the three-dimensional plasma field through the attached one or more sub-assemblies.

Treating Liquids Using the Liquid Treatment System Component 500:

The liquid treatment system component 500 can be operated in a standard water treatment mode or in a recirculation mode of operation, as discussed in the detailed description of FIG. 9. Before operating the liquid treatment system component 500 in either mode of operation, the liquid treatment system component 500 sub-assembly is attached to the plasma reaction vessel assembly 101 at the discharge aperture 128. An external power supply is energized by plugging it into a wall outlet or is connected to an energized breaker panel or other energy supply, and an external water supply line 401 is pressurized and connected with the device.

Once powered on, the operator engages the system control unit 201, and selects the operational features to determine the task, run time and mode of operation; for example, the sub-assembly control is selected to engage the liquid, seed or growth media treatment component, and the duration of time is set. The system control unit 201 will provide electrical power to the air pump 209, the plasma ignition unit 210 and the solenoid valve 211. The air pump 209 supplies compressed air or gas to the plasma reactor vessel assembly 101. The plasma ignition unit 210 then provides high voltage to the plasma reactor vessel assembly 101 via the ignition connection hardware 105 and ignition feed-through rod 115. This produces a plasma discharge inside the device. The solenoid valve 211 opens to allow water to flow to the plasma reactor vessel assembly 101, and more specifically into the outer electrode water jacket 122 and the outer electrode and finally the discharge aperture 128.

Air or gas is passed through the plasma discharge area, which chemically alters it to create ROS and RNS. After the plasma field has been established using air or gas, it contacts water that has entered the reaction zone 126 through the porous outer electrode 110.

Water entering the reaction zone 126 does so by flowing through the porous walls of the porous outer electrode 110. This water remains on the surface of the porous outer electrode 110 by the rotating air inside the reaction aperture. As the water flows downward across the surface of the porous outer electrode 110 it is also forced into apertures in the porous outer electrode 110 that water does not flow through. Water that lands in these apertures resides there for additional time which prolongs its exposure to the three-dimensional plasma field allowing the water to absorb more of the ROS and RNS. The water, air or gas containing both the ROS and RNS exits the plasma reactor vessel assembly 101 through the discharge aperture 128, where it next moves into the gas diffuser 503 which is mounted inside the contact vessel 504.

The gas diffuser 503 passes both the liquid and air or gas containing ROS and RNS through its porous surface and into water stored inside the contact vessel 504. Operating the system in this manner ensures that optimized amounts the air or gas ROS and RNS are dissolved into the water, which further concentrates the liquid.

The liquid treatment system component 500 can be operated using an external water source or in the recirculation mode. The recirculation mode treats water that has already been treated by cycling water from the contact vessel 504 back into the into the water injection unit 400 using a series of pumps, valves, fittings and hoses. Recirculating the water in this manor further enriches the water by increasing the concentration of the desired chemical species. In order to operate the liquid treatment system component 500 in a recirculation mode of operation, the contact vessel 504 must be no less than 25% full of liquid. The system control unit 201 is engaged to operate in the recirculation mode, and the treatment time is selected. The system control unit 201 is engaged to run, electrical power is provided to the air pump 209, and the relay switch 206, the plasma ignition unit 210 and the components used in the recirculation mode are activated. The air pump 209 supplies compressed air or gas to the plasma reactor vessel assembly 101 and the plasma ignition unit 210 provides high voltage to the plasma reactor vessel assembly 101, which produces a plasma discharge. The solenoid valve 211 opens to allow water to flow to the plasma reactor vessel assembly 101 and more specifically into the reaction aperture as described above.

When operating in the recirculation mode, water that is stored in the contact vessel 504 is transported by the recirculation components from the contact vessel 504 back to the water injection system, where it is returned back through the plasma system to the contact vessel 504. The water product resulting from the recirculation mode in this process is a highly enriched water product, "plasma activated water" or PAW, distinguished in that the resultant water or other liquid is more highly concentrated in ROS and RNS.

Treating Seeds Using the Seed Treatment System Component 600 for Wet and Dry Plasma Treatment:

Seed treatment using the seed treatment system component 600 chemically and physically modifies the seed coat or husk of plant seeds. These modifications allow for improved germination efficiency, plant health and harvest yield.

In preparation of operating the seed treatment system, the operator places seeds 603 into the seed treatment bag 601. The open end of the seed treatment bag 601 is coupled with the device by placing it over the bottom of the plasma reactor vessel assembly 101 at the discharge aperture 128. It is then secured in place by closing the opening in the seed treatment bag 601 around the discharge aperture 128. In the embodiment shown, a draw string 602 is used to close the opening in the seed treatment bag 601; the draw string 602 is drawn around the discharge aperture 128 and tied to secure it in place.

As with the liquid treatment system component 500, operation of the seed treatment system component 600 requires the operator to actuate and adjust the system control unit 201 to determine the run time and mode of operation; in this embodiment of the system the operator would also select wet seed treatment or dry seed treatment and adjust the relevant associated system controls. The system control unit 201 is engaged, which supplies electrical power to the air pump 209, solenoid valve 211 and plasma ignition unit 210. The air pump 209 supplies compressed air or gas to the plasma reactor vessel assembly 101 and the plasma ignition unit 210 provides high voltage to the plasma reactor vessel assembly 101 that produces a plasma discharge inside the reaction zone 126. Air or gas passing through the plasma discharge is chemically altered to create ROS and RNS.

With the seed treatment bag 601 fastened to the bottom of the plasma reactor vessel assembly 101, the seeds 603 are directly exposed to the high voltage plasma filaments, ions and charged particles exiting the discharge aperture 128. ROS and RNS are discharged from the plasma reactor vessel assembly 101 as well. All of these components modify the seed coat and alter the seeds physiology to create plasma activated seeds, or PAS, which have a greater capacity to absorb and hold liquids, germinate faster, and exhibit higher resistance to disease than non-treated seeds.

When configured for wet plasma treatment, the seed treatment system uses water entering the reaction zone 126 by capturing water flowing through the porous walls of the porous outer electrode 110. This water remains on the surface of the porous outer electrode 110 because of pressure from the rotating air inside the reaction zone 126. As the water flows downward across the surface of the porous outer electrode 110 it is also forced into additional hollow portions of the porous outer electrode 110 that water does not flow through by this pressure. Water that lands in these hollow portions resides there for additional time, which prolongs its exposure to the plasma field, allowing the water to absorb more of the ROS and RNS and become more highly concentrated.

Water exiting the plasma reactor vessel assembly 101 next enters the seed treatment bag 601 and comes in direct contact with the seeds 603. At this point the plasma treated water is highly acidic, is molecularly reduced and contains ROS and RNS. The wet plasma further accelerates the germination process and requires that the seeds 603 be sown within 24 hours.

Treating Growth Media Using the Growth Media Treatment System Component 600 for Wet and Dry Plasma Treatment:

The growth media treatment system component 700 provides gaseous and liquid nutrients as well as irrigation water directly to the root area of individual plants. Generally, the same methodology is used as with the other treatment system components, except that the growth media system component sub-assembly is attached to the plasma reaction vessel assembly in place of or in addition to the other sub-assemblies. The system control unit 201 is engaged and programmed for specific functions and time, and the device operates as described with the other sub-assemblies. Once water and gasses containing both the ROS and RNS exit the plasma reactor vessel assembly 101 at the discharge aperture 128, they move into the growth media treatment system component 700 sub-assembly.

The growth media treatment system component 700 carries both PAW and enriched air or gas to the plants by way of the distribution tube 702. The distribution tube 702, water-gas injector adaptor 703 and attached injectors 705 are placed in proximity to the desired plants; in a preferred embodiment they are located as close as possible to the plant roots, either at the surface or by subsurface application by placing injectors 705 below the soil surface. Once the air or gas and water are in close proximity to the plants, they exit the distribution tube 702 through the water-gas injector adaptor 704 and enter the injectors 705. Both air or gas and water passing through the injectors 705 are discharged into the soil or growth media through the water and gas outlet ports 706 which are positioned near the roots of the target plants.

While the description above discloses preferred embodiments of the present invention, it is contemplated that numerous variations and modifications of the invention are possible and are considered to be within the scope of the claims that follow.

I claim:

1. A device for non-thermal plasma treatment of liquids, seeds, and growth media, comprising:
    a) One or more plasma reactor vessel assemblies, further comprising:
        i. a center electrode
        ii. a center electrode insulator
        iii. a plasma reactor housing
        iv. a porous outer electrode
        v. a reaction zone that includes the area between the center electrode and the porous outer electrode, and above a discharge aperture;
        vi. a discharge aperture at the end of the reaction zone where plasma is released from the plasma reactor vessel assembly and directed to one or more system component sub-assemblies;
    b) an electrical system including ignition connection hardware and a plasma ignition unit electronically connected to the center electrode and the porous outer electrode, wherein said plasma ignition unit is configured to operate at either a set voltage and frequency or at an oscillating voltage and frequency;
    c) an air supply unit further comprising: an air pump removably attached to an air filter and in contact with an external air supply, said air pump pressurizes filtered air and releases it to a large air hose, said large air hose is connected at a first end to the air pump and connected at a second end by a Y-fitting to a plurality of small air hoses which are removably connected to the plasma reactor housing at one or more gas inlet pipes in said plasma reactor housing;
    d) a water injection unit further comprising a water supply, an external pressurized water supply line connected to said water supply; a manual shutoff valve on said external pressurized water supply line between the solenoid valve and a water flow regulator; a first water injection hose with a first end connected to the water flow regulator and a second end connected to a T-fitting and a second water injection hose with a first end connected to a first connection of a T-fitting and a second end connected to water injection port;
    e) interchangeable and removably attached sub-assemblies, including
        i. a liquid treatment system component
        ii. a seed treatment system component; and
        iii. a growth media system component.

2. The device of claim 1, wherein the center electrode further comprises a tapered electrode body with a first end and a second end, wherein said first end has a larger circumference than said second end, and wherein electricity passing between said first end and said second end establishes a three-dimensional plasma discharge field; an ignition feed through rod positioned within an ignition feed through passage in a center electrode insulator; a plasma termination point at the second end of the tapered electrode body; a gas compression zone proximate to the first end of the tapered electrode body; and a plasma ignition start point located between said gas compression zone and said first end of the tapered electrode body.

3. The device of claim 1, wherein the center electrode insulator further comprises an upper insulator section, a lower insulator section and an ignition feed-through passage that contains and supports an ignition feed-though rod.

4. The device of claim 1, wherein the plasma reactor housing further comprises:
    a) one or more gas inlet pipes; one or more gas inlet passages connected to the one or more gas inlet pipes; a gas vortex chamber proximally located to the gas inlet pipes and gas inlet passages; and a gas acceleration zone located within the gas vortex chamber wherein a high speed spinning vortex of air elongates a point-to-point arc formed between the center electrode and the porous outer electrode in said gas acceleration zone;
    b) one or more water injection ports; one or more water inlet passages proximally located to the water injection ports; and an outer electrode water jacket located within the plasma reactor housing and outside of the porous outer electrode, wherein said outer electrode water jacket is connected with and capable of receiving water from the water injection ports;
    c) a plasma ignition start point, a plasma termination point, and a gas compression zone;
    d) an insulator mounting area conforming to the center electrode insulator so that said center electrode insulator can be removably inserted into the plasma reactor housing.

5. The device of claim 1, wherein the porous outer electrode further comprises a perforated surface containing a plurality of circular, identically spaced, evenly distributed apertures which allow water to flow through it as well as to pool on its surface so that air, water and plasma can interact to increase production and concentration of a desired chemical species.

6. The device of claim 1, wherein the electrical system further comprises a system control unit capable of controlling system functionality; control power supply circuitry connecting the system control unit to the device, further comprising a main power supply circuit including at least a first low voltage power circuit and a second low voltage power circuit, a relay switch connecting and controlling said main power control circuit with said first and second low-voltage power circuits and an ignition power line, an air pump power line and an ignition unit power line, a plasma ignition unit connected with the plasma reactor housing via a high voltage ignition line; a solenoid valve connected to the external pressurized water supply line of the water control unit; and an air pump.

7. The device of claim 6, further comprising a timing device for automatic operational activation and shut-off control wherein said timing device is actuated by the system control unit and is programmable for operation of the system in one or more of the liquid treatment system component, seed treatment system component, and growth media treatment system component.

8. The device of claim 1, wherein the liquid treatment system component further comprises: a liquid contact vessel capable of holding and storing liquids and including an overflow connection to release excess liquid from said liquid contact vessel; an output channel hose with a first end removably attached to the plasma reactor housing at the discharge aperture and a second end attached to a reducer, wherein said connection hose serves as an output channel through which plasma treated water and gas is transported through the reducer and into said liquid contact vessel; said reducer is located between the discharge aperture and a connection pipe in direct contact with and removably attached to said liquid contact vessel; a bulkhead adaptor between said connection pipe and said liquid contact vessel, where the connection pipe is coupled with a gas diffuser within said liquid contact vessel and thereby connects said gas diffuser to said bulkhead adaptor.

9. The device of claim 1, wherein the seed treatment system component further comprises one or more seed treatment bags in contact with and removably attached to the plasma reactor housing at the discharge aperture.

10. The device of claim 1, wherein the growth media treatment system component further comprises a water-gas injection system; said water gas injection system comprises an output channel hose with a first end removably attached to the plasma reactor housing at the discharge aperture and a second end attached to an output channel reducer, said output channel hose is located between the discharge aperture and the output channel reducer; a water-gas injection adaptor, a distribution tube containing a plurality of apertures wherein said apertures are surrounded by adaptors fitted to and removably coupled with one or more injectors, said injectors further comprising one or more water and gas outlet ports capable of releasing treated liquid, gas, and combinations thereof into growth media.

11. The device of claim 1 further comprising one or more electronic valves to open, close and regulate the flow of water in the water injection unit, gas and air in the air supply unit, and liquid the liquid treatment system component.

12. A method for non-thermal plasma treatment of liquid, seeds and soil growth media using the device of claim 1 comprising the steps
I. attaching one or more of a liquid treatment system component, seed treatment system component, and growth media treatment system component sub-assembly or assemblies for the treatment of one or more of liquids, seeds and growth media by removably connecting the desired sub-assembly to a non-thermal plasma treatment apparatus;
II. operatively engaging the device's system by powering it on through a system control unit capable of actuating and regulating system functionality and selecting the desired functional settings, and further selecting either wet or dry treatment options;
III. providing electricity through the apparatus's device's electrical system, and a pressurized external flow of air or gas to a non-thermal plasma treatment apparatus through the apparatus's air supply unit;
IV. if wet plasma treatment is desired, further supplying water through the apparatus's device's water injection unit;
V. engaging a plasma ignition unit in the device;
VI. generating a three-dimensional plasma field within the device's plasma reactor vessel assembly and directing it through the device's discharge aperture and into one or more of the system's device's sub-assemblies for treatment; and
VII. exposing one or more of the liquid, seed and growth media to the three-dimensional plasma field.

13. The method of claim 12, wherein the treatment of liquid further comprises:
I. attaching the liquid treatment system component sub-assembly to the plasma reactor housing of the device for non-thermal plasma treatment;
II. selecting the desired treatment settings for liquid treatment;
III. directing the plasma discharge exiting the discharge aperture to a liquid contact vessel containing at least twenty-five percent (25%) by volume of liquid to be treated by the system by passing it through a gas diffuser;
IV. exposing the liquid to be treated to the plasma discharge;
V. recirculating the liquid back through the device for non-thermal plasma treatment one or more times to increase the concentration of a desired reactive species, which generates a ROS and RNS-enhanced PAW product.;
and/or wherein the treatment of seeds further comprises:
VI. attaching a seed treatment system component sub-assembly to the plasma reactor housing of the device for non-thermal plasma treatment;
VII. selecting the desired treatment settings for seed treatment and
VIII. exposing the seeds to be treated to the plasma discharge, including one of either wet or dry plasma;
and/or wherein the treatment of growth media further comprises:
IX. attaching a water-gas injection system to the plasma reactor housing of the device for non-thermal plasma treatment;
X. selecting the desired treatment settings for liquid treatment;
XI. directing the plasma discharge exiting the discharge aperture to the said water-gas injection system; and
XII. exposing the liquid to be treated to the plasma discharge.

* * * * *